C. SLATTERY.
DRIER.
APPLICATION FILED NOV. 6, 1919.
1,354,223.
Patented Sept. 28, 1920.
3 SHEETS—SHEET 1.
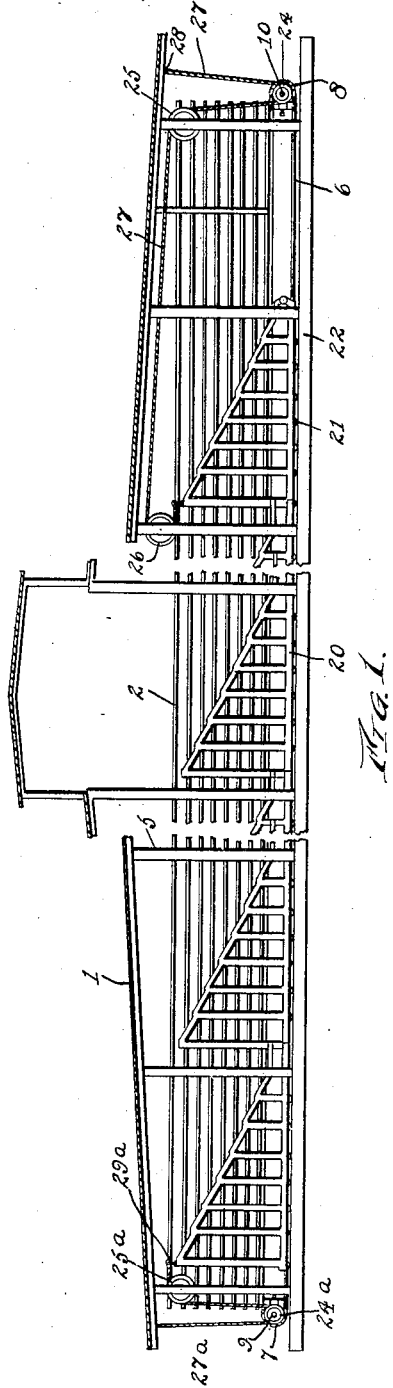
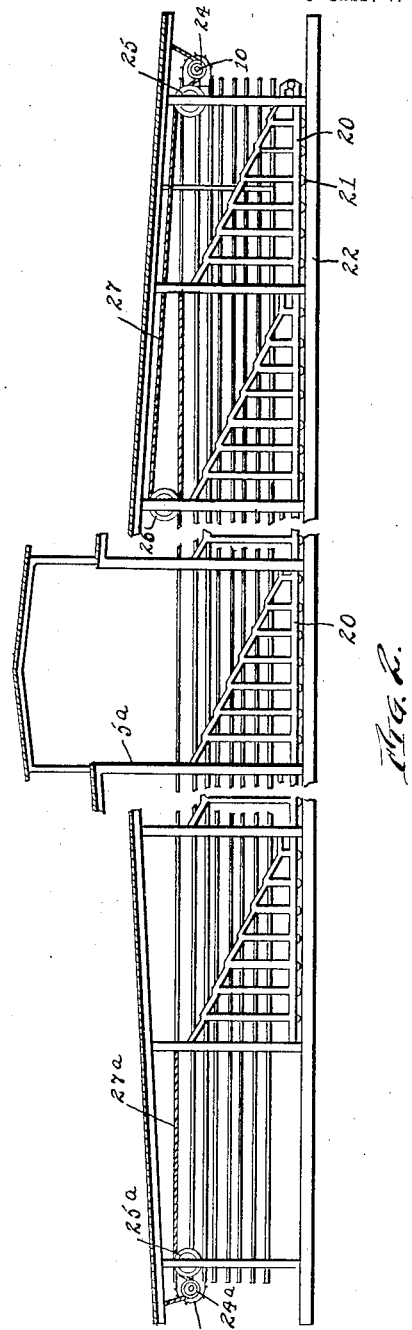

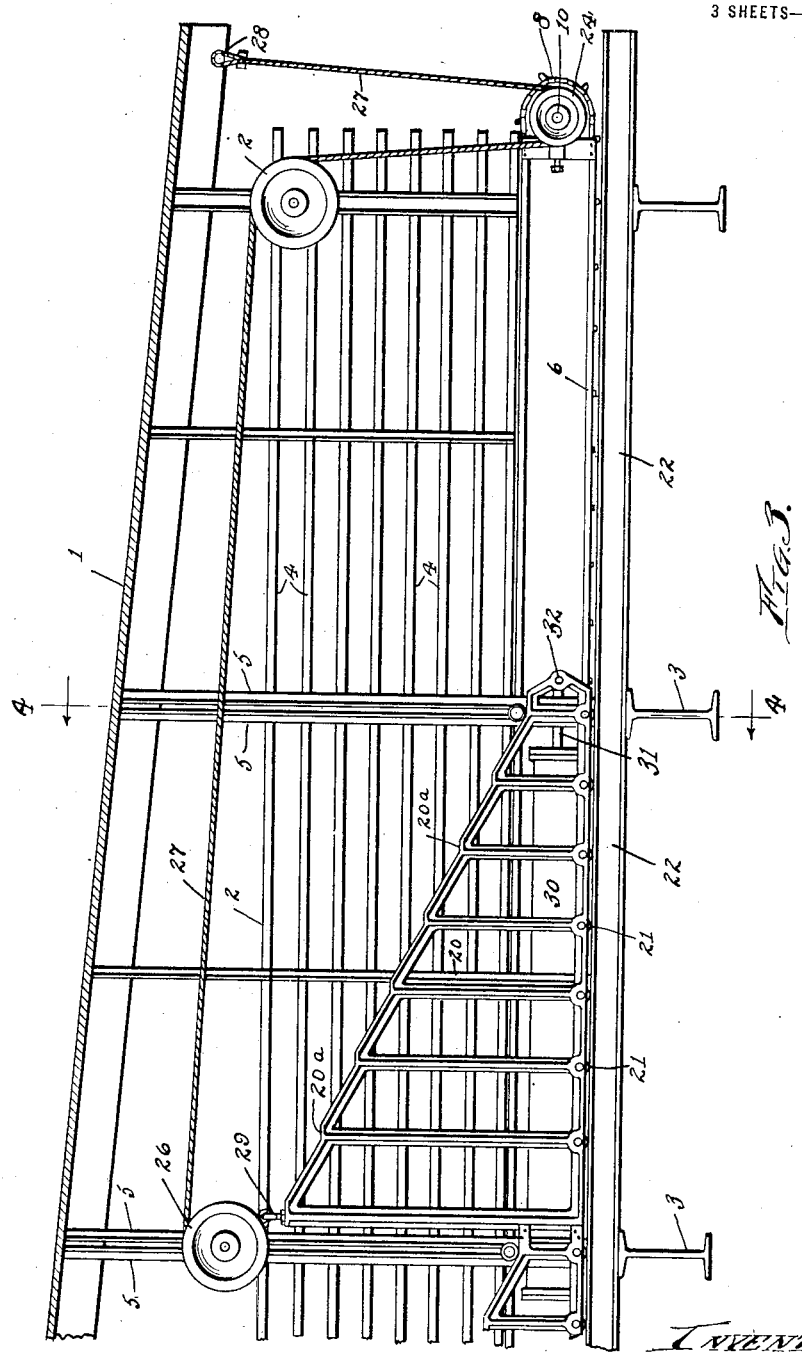

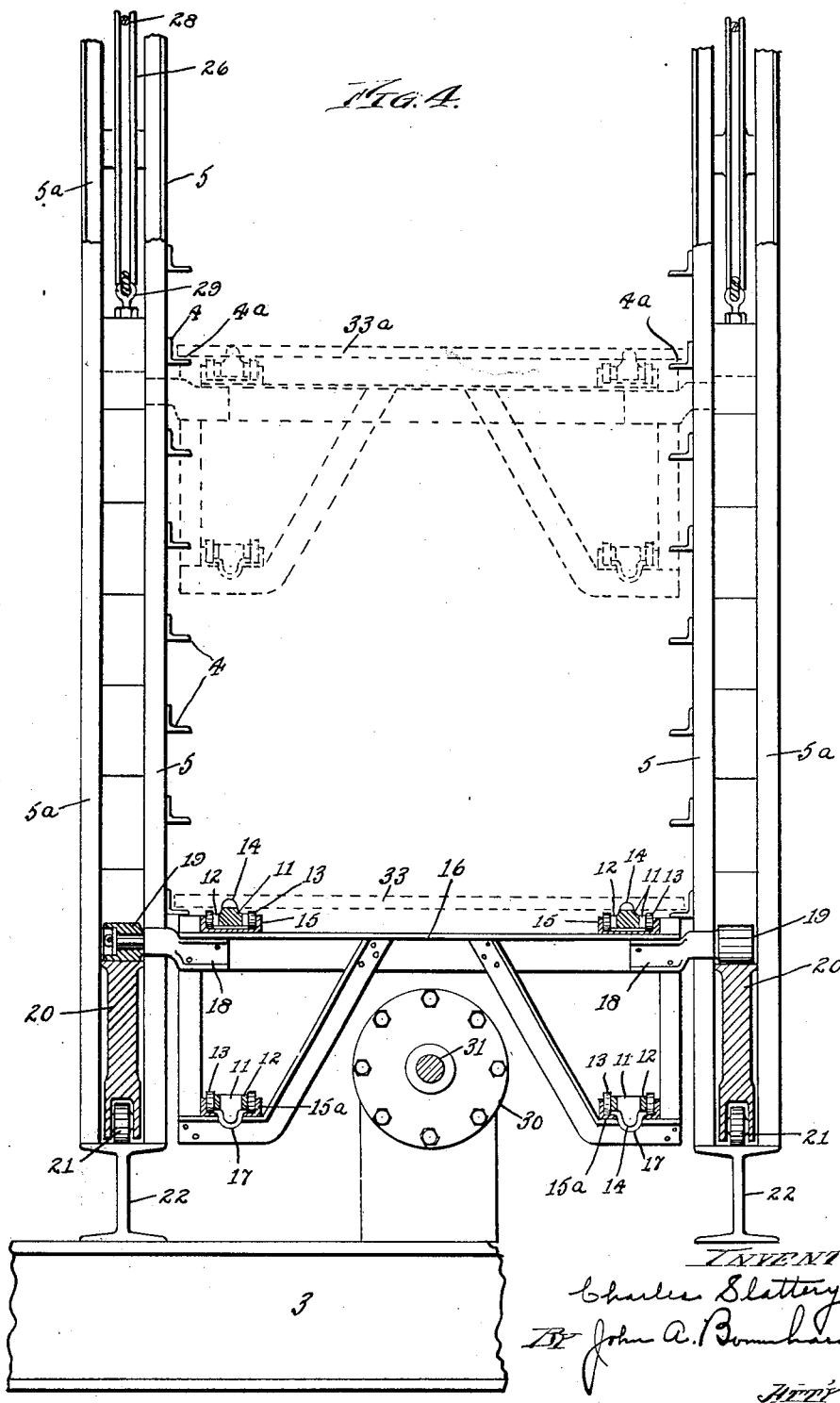

UNITED STATES PATENT OFFICE.

CHARLES SLATTERY, OF CUYAHOGA FALLS, OHIO.

DRIER.

1,354,223.      Specification of Letters Patent.      Patented Sept. 28, 1920.

Application filed November 6, 1919. Serial No. 335,985.

*To all whom it may concern:*

Be it known that I, CHARLES SLATTERY, citizen of the United States, residing at Cuyahoga Falls, in the county of Cuyahoga and State of Ohio, have invented certain new and useful Improvements in Driers, of which the following is a specification.

This invention relates to a means for placing sundry articles (bricks, for example) upon racks in suitable position for drying and seasoning in a rapid and efficient manner and by an automatic method.

Means are provided whereby the articles to be so disposed of may be placed upon various supporting means and in several tiers, the means being so constructed as to obviate the necessity of employing more than a minimum amount of labor.

With the foregoing objects in mind the invention consists of the novel arrangement and combination of parts hereinafter illustrated, described and specifically pointed out in the accompanying claims.

In the drawings wherein like reference numerals designate similar parts of reference throughout the various views, Figure 1 is a longitudinal section of a dry house in a loaded condition; Fig. 2 is a similar view, showing the cams and conveyer in the proper position previous to loading; Fig. 3 is an enlarged section of a portion of the drying racks with the loading mechanism shown in detail and Fig. 4 is a transverse section on the line 4—4 of Fig. 3.

The invention consists of a drying house 1 in which are placed dry racks 2 and the loading mechanism hereinafter described. The dry house is preferably erected upon suitable structural iron work 3 in order to permit the entrance of dry heated air in a thorough and even distribution although it is obvious that this may be effected in various other ways.

The vertical supports 5 and 5ª for the roof provide a convenient method whereby the tiers of pallet or tray supports may be conveniently supported. These supports in effect are composed of angle irons 4 which are rigidly bolted or riveted to the vertical supports 5. The supports 5ª differ from the supports 5 in that they are of channel formation and are spaced laterally from the supports 5 sufficiently to permit sliding cams to be freely guided therebetween, the space formed by the angle iron supports 5—5 providing a vertical guideway for the cross members of the conveyer frame as will be more fully described hereinafter.

The various supports 5 with the angle iron 4 form a plurality of narrow passageways therebetween and in each passageway is placed a loading device consisting of an endless chain conveyer 6 of a length equal to the passageway and driven from either end by means of sprocket wheels 7 and 8 mounted on shafts 9 and 10. The conveyer chain may be made up of links 11 and 12 illustrated in the drawing, each link being provided with rollers 13 the purpose of which will be hereinafter described.

At convenient points on the chain a link 11 is provided with a lug or finger 14 which insures a hold of any article carried by the conveyer. A frame work is provided as a positive support for the conveyer chain and it is made up of two channel irons 15 carried by cross members 16, these cross members being spaced in line with the vertical supports 5. The channel iron 15 serves the purpose of a track for the conveyer chain which is carried by the rollers 13. The underside of the conveyer chain is supported in a similar manner except that two angle irons 15ª are substituted for the channels 15, the space between them indicated at 17 forming a clearance for the lugs 14. The cross members 16 are in turn supported by brackets 18 which are permitted to move vertically between the vertical supports 5—5 and are provided with rollers 19 at their ends which rest upon sliding cams 20, these cams being permitted longitudinal horizontal movement between the vertical supports 5 and 5ª, as hereinbefore referred to. The face of each of the cams 20 is provided with a series of steps indicated at the point 20ª which serve as rests to support the rollers 19. Each cam is also provided with supporting wheels or rollers 21 which rest upon an I-beam 22 forming the double purpose of a track for the cam and a structural part of the drier. An additional means of support is provided at each end of the conveyer by means of a cable and sheave arrangement. On the right hand end sheaves 24 are mounted upon the shaft 10, a second pair of sheaves 25 mounted between the uprights 5, and a third pair of sheaves 26 mounted between similar uprights. A pair of cables 27 fastened at one end to the roof of the drier at the point 28 passes under the pair of sheaves 24, over the second sheaves 25 and around the sheaves 26 and are secured to the sliding cams by means of the eye bolts 29, and at the opposite end of the drier but two pair of sheaves 24ª and 25ª are necessary, the cables 27ª passing over the sheaves 25ª directly to the cams, to which they are connected by means of the eye bolts 29ª. It follows therefore that a vertical movement of the conveyer is coincident with the longitudinal movement of the cams since the supports for the conveyer are connected by the cables to the cams.

Means are provided for moving the sliding cams 20, comprising an air cylinder 30 located between the side frames and containing a piston and its rod 31 which is fastened to a cross member 32 secured to the sliding cams.

The drier may be loaded from either end, either by hand or any mechanical means, the bricks or other articles being placed upon pallets or trays. Assuming therefore that the drier is to be loaded at the right hand end in Figs. 1 and 2, the air cylinder is operated to advance the cams to the right hand end of the house as shown in Fig. 2. This action pulls the cables in such direction as to take up the loops containing the sheaves 23 and 24, thereby lifting shafts 9 and 10 and raising the conveyer so that its upper run is substantially in line with the upper supports 4, as indicated in dotted lines in Fig. 4, the conveyer and its frames being lifted by the pull of the cables as well as by the rollers 19, riding up the faces of the cams as the latter are moved to the right. The conveyer is then started by proper control of its driving apparatus, which may be of any suitable kind, and the upper run of the conveyer travels to the left carrying with it the pallets indicated at 33ᴬ until there is a full line of pallets along the upper supports 4. The cams are then backed off or moved to the left by proper operation of the air cylinder, and this permits the conveyer as a whole to drop, the pallets remaining supported at their opposite sides by the supports 4, and the rollers 19 running down the cams until they reach the next step, which locates the upper run of the conveyer in line with the next set of supports 4 below. Then the conveyer is started again and the pallets fed in until this next section is full, whereupon the conveyer is stopped and lowered to the next section. And this operation is repeated until all the racks, or as many as desired, are filled. The bricks or other articles are then allowed to dry until they are ready for unloading.

In unloading, the reverse operation is performed, that is, the conveyer is started and by engagement with the pallets on the lower supports, the latter are carried out to the end of the machine and discharged therefrom into the hands of the workmen or to mechanical devices placed to receive the same. When the lower section is cleared, the conveyer is stopped, the cams being then in the position shown in Fig. 1. The cams are then advanced one step toward the right, raising the conveyer to engagement with the pallets on the next supports above. The conveyer is then started until that section is cleared, and the cams are then advanced another step; and the operation is repeated until all the sections are cleared.

It may be noted that the house may be loaded or unloaded from either end, according to the direction the conveyer is driven. In loading there is a successive lowering of the conveyer by backward movement of the cams step by step to the succeeding supports from the top to the bottom and in unloading there is a successive movement of the cams step by step to position the conveyer so that it will pick up the pallets on the supports in succession from the bottom to the top.

The machine provides a new and effective method for loading and unloading drying racks or houses and the invention is not limited to the particular mechanism shown, but may be embodied in various other structures within the scope of the following claims.

I claim:

1. A drier comprising a series of supports one above the other, adapted to support pallets or trays, a conveyer movable up and down beside the supports and adapted to convey said pallets along the respective supports, and means to raise or lower the conveyer, to register same with the pallets on the supports successively.

2. A drier comprising a frame, a series of supports at opposite sides thereof and adapted to support pallets or trays, a conveyer movable up and down between the supports and adapted to engage and convey said pallets along the respective supports, and means to raise or lower the conveyer, to register the same with the respective supports.

3. A drier comprising a frame, a series of supports at opposite sides thereof and adapted to support pallets or trays, a conveyer movable up and down between the supports and adapted to engage and convey said pallets along the respective supports, and means to raise or lower the conveyer, to register the same with the respective supports, said means comprising cams movable lengthwise of and beside the supports and having cam faces supporting the conveyer frames.

4. A drier comprising a frame, a series of supports at opposite sides thereof and adapted to support pallets or trays, a conveyer movable up and down between the supports and adapted to engage and convey said pallets along the respective supports, and means to raise or lower the conveyer, to register the same with the respective supports, said means comprising cams movable lengthwise of and beside the supports and having steps corresponding to the respective supports and supporting the conveyer in registry with the supports respectively.

5. A drier comprising a main frame, a vertical series of substantially horizontal supports at opposite sides thereof adapted to support pallets, conveyer frames movable vertically at opposite ends of the supports, a conveyer carried by said frames and movable between and along the supports and adapted to engage and convey said pallets along the respective supports, and means to raise and lower the conveyer frames to register the conveyer with any desired supports.

6. A drier comprising a main frame, a vertical series of substantially horizontal supports at opposite sides thereof adapted to support pallets, conveyer frames movable vertically at opposite ends of the supports, a conveyer carried by said frames and movable between and along the supports and adapted to engage and convey said pallets along the respective supports, and means to raise and lower the conveyer frames to register the conveyer with any desired supports, said means consisting of cams at opposite sides of the main frames and supporting the ends of the conveyer frames, and movable horizontally to raise or lower the conveyer frames.

7. A drier comprising a main frame, a vertical series of substantially horizontal supports at opposite sides thereof adapted to support pallets, conveyer frames movable vertically at opposite ends of the supports, a conveyer carried by said frames and movable between and along the supports and adapted to engage and convey said pallets along the respective supports, and means to raise and lower the conveyer frames to register the conveyer with any desired supports, said means consisting of inclined cams at opposite sides of the main frame, the cams having steps corresponding to the supports and supporting the ends of the conveyer frames with the conveyer in operative alinement with the respective supports, the cams being movable horizontally to raise or lower the conveyer frames.

8. A drier comprising a main frame, a vertical series of supports at opposite sides thereof, adapted to support pallets or the like, conveyer frames movable up and down in the frame, between the supports, an endless belt conveyer supported by said frames, rollers at the ends of the supports, about which the belt passes, cams movable horizontally beside the supports and supporting said frames to raise or lower the same, and cables connected to said cams and about said rollers, and constructed to lift and lower the same as the cams are moved back and forth.

9. A drier comprising a main frame having opposite sides, opposite supports supported by said sides and adapted to support pallets or the like, conveyer frames extending across between the sides, a horizontally traveling conveyer supported by said frames between the opposite supports, and cams movable horizontally along said sides and supporting the ends of the conveyer frames and adapted to raise or lower said frames and the conveyer supported thereby to engage the pallets on any desired supports.

In testimony whereof, I affix my signature in presence of two witnesses.

CHARLES SLATTERY.

Witnesses:
D. W. SLATTERY,
JOHN A. BOMMHARDT.